(12) United States Patent
Lang

(10) Patent No.: US 8,033,733 B2
(45) Date of Patent: Oct. 11, 2011

(54) BEARING ELEMENT

(75) Inventor: Hubert Lang, Au an der Donau (AT)

(73) Assignee: Miba Gleitlager GmbH, Laakirchen (AT)

( * ) Notice: Subject to any disclaimer, the term of this patent is extended or adjusted under 35 U.S.C. 154(b) by 1075 days.

(21) Appl. No.: 11/413,711

(22) Filed: Apr. 28, 2006

(65) Prior Publication Data

US 2006/0245675 A1    Nov. 2, 2006

(30) Foreign Application Priority Data

Apr. 29, 2005 (AT) .................................. A 734/2005
Oct. 5, 2005 (AT) ................................ A 1625/2005

(51) Int. Cl.
*F16C 33/18* (2006.01)
*F16C 33/02* (2006.01)

(52) U.S. Cl. .................... 384/297; 384/276; 384/907

(58) Field of Classification Search .................. 384/276, 384/297, 299, 300, 907, 908, 909
See application file for complete search history.

(56) References Cited

U.S. PATENT DOCUMENTS

| | | | |
|---|---|---|---|
| 4,303,537 A | 12/1981 | Laepple et al. | |
| 4,329,238 A | 5/1982 | Mitrofanova et al. | |
| 4,532,054 A | 7/1985 | Johnson | |
| 4,618,270 A | 10/1986 | Kraus | |
| 5,063,258 A * | 11/1991 | Babler ........................... | 523/171 |
| 5,217,814 A | 6/1993 | Kawakami et al. | |
| 5,525,246 A | 6/1996 | Kamiya et al. | |
| 5,792,717 A | 8/1998 | Takayama | |
| 6,450,594 B1 | 9/2002 | Ketting et al. | |
| 6,506,503 B1 * | 1/2003 | Mergen et al. ................. | 428/650 |
| 6,575,859 B2 | 6/2003 | Ohira et al. | |
| 6,607,820 B2 | 8/2003 | Niwa et al. | |
| 6,655,842 B2 | 12/2003 | Kanayama et al. | |
| 6,770,381 B2 | 8/2004 | Kanayama et al. | |
| 2002/0155304 A1 | 10/2002 | Tanaka et al. | |
| 2003/0134141 A1 | 7/2003 | Okado et al. | |
| 2003/0144156 A1 | 7/2003 | Saito | |
| 2004/0224856 A1 * | 11/2004 | Saiki et al. ..................... | 508/108 |
| 2005/0003225 A1 * | 1/2005 | Gartner ......................... | 428/610 |

(Continued)

FOREIGN PATENT DOCUMENTS

CA    1 141 745    2/1983

(Continued)

OTHER PUBLICATIONS

Machine Translation of JP09079262.*

(Continued)

*Primary Examiner* — Thomas R Hannon
*Assistant Examiner* — Alan Waits
(74) *Attorney, Agent, or Firm* — Collard & Roe, P.C.

(57) ABSTRACT

The invention relates to a bearing element (1) with a metallic support body (2), a bearing metal layer (3) arranged over the top and a polymer layer (4) arranged on the top of the latter, whereby the polymer layer (4) consists of a polyimide resin, molybdenum sulphide ($MoS_2$) and graphite. The proportion of the polyimide resin in the polymer layer (4) is selected from a range with a lower limit of 60% and an upper limit of 80%, the proportion of $MoS_2$ is selected from a range with a lower limit of 15% and an upper limit of 25% and the proportion of graphite is selected from a range with a lower limit of 5% and an upper limit of 15%.

11 Claims, 3 Drawing Sheets

U.S. PATENT DOCUMENTS

| | | |
|---|---|---|
| 2005/0257684 A1 | 11/2005 | Sugiura et al. |
| 2006/0147138 A1* | 7/2006 | Johal et al. .................. 384/276 |
| 2007/0065067 A1 | 3/2007 | Gartner et al. |
| 2008/0159671 A1 | 7/2008 | Leonardelli |
| 2008/0247687 A1 | 10/2008 | Stecher |

FOREIGN PATENT DOCUMENTS

| | | |
|---|---|---|
| DE | 20 00 632 A | 7/1970 |
| DE | 2206400 A | 8/1973 |
| DE | 24 15 327 A | 1/1975 |
| DE | 25 04 833 A | 8/1975 |
| DE | 27 34 362 | 2/1979 |
| DE | 82 12 389 | 8/1983 |
| DE | 290 210 | 10/1983 |
| DE | 32 21 785 A | 1/1984 |
| DE | 33 43 309 A | 6/1985 |
| DE | 39 37 352 | 5/1991 |
| DE | 195 19 468 | 11/1995 |
| DE | 198 14 756 A | 3/1999 |
| DE | 199 29 961 | 1/2001 |
| DE | 101 07 129 A1 | 8/2001 |
| DE | 10 2005 023 457 | 12/2005 |
| DE | 10 2005 009 552 | 9/2006 |
| EP | 0 044 577 A | 1/1982 |
| EP | 060 725 A | 9/1982 |
| EP | 0 340 838 A | 11/1989 |
| EP | 0 340 839 A | 11/1989 |
| EP | 0939106 A | 9/1999 |
| EP | 0 984 182 A | 3/2000 |
| EP | 1 065 138 A2 | 1/2001 |
| EP | 1 236 914 A | 9/2002 |
| EP | 1 342 806 | 9/2003 |
| EP | 1 522 750 | 4/2005 |
| EP | 1 764 522 | 3/2007 |
| EP | 1 892 429 | 2/2008 |
| FR | 21 33 320 A | 11/1992 |
| GB | 2 337 306 A | 11/1999 |
| GB | 2 345 095 | 6/2000 |
| GB | 2 384 033 B | 7/2003 |
| JP | 53-007780 A | 1/1978 |
| JP | 59-182852 | 10/1984 |
| JP | 60-001424 A | 1/1985 |
| JP | 11-13638 | 5/1989 |
| JP | 04-83914 A | 3/1992 |
| JP | 5-157115 | 6/1993 |
| JP | 06-071810 | 3/1994 |
| JP | 7-110025 | 4/1995 |
| JP | 07-247493 A | 9/1995 |
| JP | 7-238209 | 12/1995 |
| JP | 7-238936 | 12/1995 |
| JP | 09-79262 A | 3/1997 |
| JP | 09-194626 | 7/1997 |
| JP | 2000-240657 | 9/2000 |
| JP | 2001-080551 | 3/2001 |
| JP | 2001/173644 A | 6/2001 |
| JP | 2001-227604 | 8/2001 |
| JP | 2002-061652 | 2/2002 |
| JP | 2003-184855 | 7/2003 |
| JP | 2007-146141 | 6/2007 |
| JP | 2008-272416 | 11/2008 |
| SU | 525730 | 8/1976 |
| SU | 1809892 | 12/1990 |
| WO | WO 97/38046 A | 10/1997 |
| WO | WO 2008/014531 | 2/2008 |

OTHER PUBLICATIONS

Woydt et al, "Verschleiβschutz in Gleisketten mit harten und weichen Oberflächen", Wissensportal baumaschine.de 1 (2004) www.baumaschine.de/Portal/Archive/1_2004/Wissenschaft/verschleiss/verschhleiss.pdf.

Material Safety Data Sheet for Molykote® 7409 Anti-Friction Coating, Dow Chemical Company (Revision Date Sep. 8, 2005).

Excerpt, "Lagerwerkstoffe," which comes from the book Virubov D. N., Efimov S.I. u.a. "Bearing Materials," Moskau, 1984, pp. 237-239. (With English Translation) (First Russian Office Action).

R. Franke et al., Kunststoffschichtverbunde für die Anwendung in hydrodynamischen Gleitlagern, 2004, pp. 5-10.

* cited by examiner

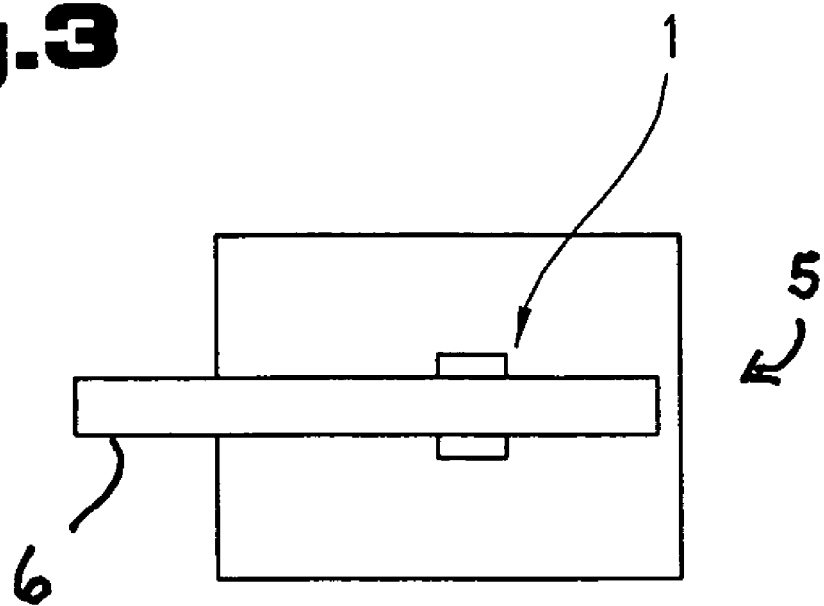

BEARING ELEMENT

CROSS REFERENCE TO RELATED APPLICATIONS

Applicant claims priority under 35 U.S.C. §119 of AUSTRIAN Patent Application No. A 734/2005, filed on 29 Apr. 2005, and AUSTRIAN Patent Application No. A 1625/2005, filed on 5 Oct. 2005.

BACKGROUND OF THE INVENTION

1. Field of the Invention

The invention relates to a bearing element with a metallic support body, a bearing metal layer arranged on top and a polymer layer arranged over the latter, whereby the polymer layer comprises a polyimide resin, molybdenum sulphide ($MoS_2$) and graphite, a motor with a shaft which is mounted by a bearing element, whereby the bearing element comprises at least one metal support body and a bearing metal layer arranged over the latter, as well as the use of a lubricating varnish made from a polymer.

2. Prior Art

Coatings of tribologically stressed components or surfaces need to satisfy various different requirements. On the one hand, a coating is required that as low friction as possible, that is relatively soft and which can therefore adapt well to wear-related abrasion and lubricating partners. On the other hand, it needs to have a sufficiently high degree of mechanical stability and strength in order to absorb the static and the dynamic vibrational loads and thus increase its fatigue strength and lifetime. Developments, for example in the motor industry, are moving towards greater specific performance, in order to increase effectiveness in particular with respect to ever stricter standards relating to exhaust gas, and thereby increase the profitability and ecofriendliness of internal combustion engines. A large number of components in an internal combustion engine are affected by this development, such as for example the radial lubricating bearings that are highly stressed by very high torques and the continually increasing ignition pressures for optimising the combustion process, for example in a direct injection turbo diesel engine. By means of the high-performance injection systems of these engines the components of the injection pumps and their measuring instruments are also subject to these high stresses, or other components such as rams, pins or rollers are affected by the high loads. Aluminium alloys are frequently used for these components, as thereby a good ratio can be achieved between the properties obtained and the required costs.

The most recent developments in this field increasingly show the use of so-called lubricating varnishes—even though their use has been known about in principle for several years.

Thus, e.g. DE 22 06 400 A describes a bonding material with a metallic support body and a frictional or lubricating layer bonded by adhesive to the support body made of thermally highly resistant plastics, which contains thermosetting polyimide resins and additives improving the running properties of the bearing, such as polytetrafluoroethylene, metallic bearing alloys or the like, whereby the friction and/or the lubricating layer contains the polyimide resins and the additives improving the running property as a mixture of fine-grained or fine-powdered material, and contains polyimide varnish as the binding agent, which bonds the fine-grained or fine-powdered mixture in the frictional and/or lubricating layer as well as the frictional or lubricating layer itself to the support body. The lubricating layer can in this case contain between 70 and 20 wt. % thermosetting polyimide resins and about 30 to 80 wt. % self-lubricating additives. Graphite, molybdenum and oxides are named as the self-lubricating additives.

From EP 0 939 106 A a lubricating coating material is known which as a matrix material contains PTFE or PTFE in combination with other fluorothermoplasts, the melting point of which lies above 260° C., whereby at least one powdered polyaramide is included, the proportion of which relative to the total amount of PTFE or the mixture of PTFE and other fluorothermoplasts and the polyaramide is 10 to 50 vol. %.

Also in EP 1 236 914 A a lubricating bearing is described which has a resin coating on a bearing metal layer, whereby the resin coating has a thermosetting resin with specific physical properties in an amount from 70 to 30 vol. % with self-lubricating additives in an amount from 30 to 70 vol. %, and whereby the Vickers hardness level is not greater than 20. The resin can for example be a polyamide imide resin. Molybdenum disulphide, graphite, boron nitride, tungsten disulphide, polytetrafluoroethylene, lead etc. are named as self-lubricating additives.

Polymers for use as coating materials of lubricating elements are described in the following documents: U.S. Pat. No. 5,525,246 A, JP 60-1424 A, EP 0 984 182 A, JP 04-83914 A, JP 07-247493 A, GB 2 337 306 A, JP 09-79262 A, JP 2001/173644 A, DE 20 00 632 A, DE 33 43 309 A, DE 32 21 785 A, WO 97/38046 A, EP 0 340 839 A, EP 0 044 577 A, EP 0 340 838 A, DE 24 15 327 A, EP 060 725 A, DE 198 14 756 A, U.S. Pat. No. 4,618,270 A, DE 25 04 833 A, FR 21 33 320 A, GB 2 384 033 B, JP-53-007780 A.

SUMMARY OF THE INVENTION

The underlying objective of the invention is to provide a bearing element with a polymer coating which has improved properties.

This objective of the invention is solved independently in that the proportion of polyimide resin in the polymer layer of the bearing element is selected from a range with a lower limit of 60% and an upper limit of 80%, the proportion of $MoS_2$ is selected from a range with a lower limit of 15% and an upper limit of 25% and the proportion of graphite is selected from a range with a lower limit of 5% and an upper limit of 15%, whereby the proportion of the polyimide resin is preferably related to the dissolved polyimide resin in the solvent to be removed, i.e. to the proportion of resin in the varnish to be applied, by an engine, in which to prevent material transfer from the shaft to the bearing element with a fixed shaft a polymer layer is arranged on the bearing metal layer, and by the use of a lubricating varnish for this.

Compared to lubricating varnish coatings already used in the field of lubricating bearings the composition according to the invention shows in a surprising manner, despite the high proportion of $MoS_2$ and graphite in the polyimide resin, an unexpected improvement in the wearing resistance of the bearing element. It is unexpected, as with less polyimide resin, which can be seen as a bonding agent for the friction-reducing additives, it would be expected that the cohesiveness of the layer would deteriorate and that the latter would "break up". This does not occur with the selected proportions of $MoS_2$ and graphite, in particular with the ratio of the proportion of $MoS_2$ to graphite, whereby the Applicant has developed no theory for this at the current time. It is suspected however that there is an interaction between the $MoS_2$ and the graphite particles.

In addition to the improved wearing resistance with the bearing element according to the invention the resistance to cavitation is also improved. Furthermore, there is a reduction in its tendency to corrode.

It is also an advantage that the polymer layer according to the invention can be applied directly onto the bearing metal layer, i.e. a nickel layer, as used for conventional lubricating bearings known from the prior art, is no longer needed as a diffusion barrier, so that a bearing element according to the invention is not only equally as good in terms of its mechanical properties as conventional multilayered lubricating bearings, but it is also more economical to produce the bearing element of the invention.

It is also advantageous that the polymer layer according to the invention is not limited to special bearing elements but according to current knowledge can be applied onto every bearing metal.

In the past bearings were subject to failure when aluminium was used as the bearing material, presumably due to material transfer and microwelding of the bearing material onto the shaft caused by micromovements. These kinds of material transfers can occur when the shaft lies at rest on the bearing, and the whole system makes micromovements, e.g. when transporting an assembled engine to the site of use, or during the operation of several motors adjacent to one another, when not all of the latter are running simultaneously. With the motor according to the invention this is prevented in an advantageous manner by the polymer layer, as said layer has practically no affinity to steel. However, even if there is a very small transfer of material, for example the embedding of the lubricating varnish into the roughness profile of the shaft, this is not in fact a problem as the pairing lubricating varnish-lubricating varnish creates even less friction than the pairing lubricating varnish-steel.

In embodiments of the invention the proportion of the polyimide resin, preferably related to polyimide resin with solvent, can be selected from a range with a lower limit of 65% and an upper limit of 75% or a lower limit of 67.5% and an upper limit of 72.5% or the proportion of polyamide resin can be 70%.

It is also advantageous that the proportion of $MoS_2$ is selected from a range with a lower limit of 17% and an upper limit of 22% or a lower limit of 18.5% and an upper limit of 21.5% or the proportion of $MoS_2$ is 20%.

Furthermore, according to further developments of the invention the proportion of graphite is selected from a range with a lower limit of 7% and an upper limit of 13% or an upper limit of 8.5% and an upper limit of 11.5% or the proportion of graphite is 10%.

With all of these embodiments—or with all of the following data on the lower and upper range limits—it is possible for the respective proportions to be selected if necessary from the respective limit ranges between the lower limits and upper limits.

It has proved to be particularly advantageous if a polyamide imide resin is used as the polyimide resin for the polymer layer.

By means of the aforementioned measures it is not only possible to optimise all of the properties of the polymer layer, but it is also possible to adapt individual properties specifically, such as e.g. wearing resistance, corrosion resistance, resistance to friction welding etc., to the respective area of use, even if the further properties of the polymer layer are not improved to the same extent.

The $MoS_2$ platelets can have an average length selected from a range with a lower limit of 10 μm and an upper limit of 40 μm or a lower limit of 15 μm and an upper limit of 35 μm or a lower limit of 18 μm and an upper limit of 25 μm and/or an average width, selected from a range with a lower limit of 10 μm and an upper limit of 40 μm or an lower limit of 15 μm and an upper limit of 35 μm or a lower limit of 18 μm and an upper limit of 25 μm and/or an average height, selected from a range with a lower limit of 2 nm and an upper limit of 20 nm or a lower limit of 5 nm and an upper limit of 15 nm or a lower limit of 5 nm and an upper limit of 8 nm.

It is also possible for graphite to be used with a particle size selected from a range with a lower limit of 2 μm and an upper limit of 8 μm.

The ratio of $MoS_2$ to graphite can be selected according to a further development of the invention from a range with a lower limit of 1.5:1 and an upper limit of 4.5:1.

In this way the self-lubricating behaviour of the polymer layer can be varied over broad limits, so that if necessary taking into consideration the respective proportions of $MoS_2$ or graphite, i.e. on varying the proportion ratios of these two additives to polyimide resin, at least one of the properties of the polymer layer can be adapted in particular to the respective application.

The bearing metal layer can be formed by an alloy, selected from a group comprising aluminium base alloys, tin-based alloys, lead-based alloys, copper-based alloys, CuPb-based alloys, AlSn-based alloys, alloys with a base of AlZn, AlSi, AlSnSi, CuAl, CuSn, CuZn, CuSnZn, CuZnSn, CuBi and AlBi, whereby the latter are well known with respect to their properties from the relevant literature on bearing elements and need not be discussed in more detail here. In this case the advantage is that the adhesiveness of the polymer layer to these bearing metal materials is improved even without the use of otherwise necessary adhesive intermediate layers.

As already mentioned, it is also advantageous if the polymer layer is arranged directly on the bearing metal layer, so that conventionally used diffusion barrier layers such as e.g. nickel barriers need not be used.

It is also possible, particularly with sufficient adhesiveness that the bearing metal layer is arranged directly on the support body, i.e. without intermediate layers and adhesive means, whereby the assembly of the bearing element can be simplified and thus the manufacturing costs can also potentially be lowered.

It has also proved to be advantageous after the testing of the bearing element according to the invention, if the surface of the polymer layer has an arithmetic average roughness value Ra according to DIN EN ISO 4287 or ASME B 46.1, selected from a range with a lower limit of 0.2 μm and an upper limit of 1.5 μm or a lower limit of 0.5 μm and an upper limit of 1.0 μm or a lower limit of 0.8 μm and an upper limit of 0.9 μm, or if according to further embodiments the surface of the polymer layer has a maximum roughness profile height Rz according to DIN EN ISO 4287 or ASME B 46.1, selected from a range with a lower limit of 0.5 μm and an upper limit of 10 μm or a lower limit of 3 μm and an upper limit of 8 μm or a lower limit of 5 μm and an upper limit of 6 μm.

By these means it is achieved, on the one hand, that during the warm-up phase due to the profile tips there is a smaller contact surface to the shaft to be mounted—as viewed relative to the entire inner surface of the bearing element—, and thereby lower friction, as would be expected purely from the material selection or a polyimide resin-steel pairing, and, on the other hand, after this warm-up phase the tips are worn away so far that the bearing has the necessary play tolerances.

The polymer layer can have an average thickness selected from a range with a lower limit of 1 μm and an upper limit of 40 μm or a lower limit of 3 μm and an upper limit of 30 μm or a lower limit of 4 μm and an upper limit of 25 μm, whereby the bearing element can be adapted according to the respective application, such as e.g. large bearings or small bearings, and thus a corresponding optimising of the cost can be achieved with long-term reliable, uniform properties of the bearing element.

The polymer layer advantageously has a Vickers hardness, selected from a range with a lower limit of 20 HV and an upper limit of 45 HV or a lower limit of 22 HV and an upper limit of 35 HV or a lower limit of 25 HV and an upper limit of 30 HV, whereby suitably improved lubricating properties can be obtained with sufficient fatigue strength of the bearing element.

In particular the bearing element is designed as a lubricating bearing shell or half-shell or bearing bush.

The polymer layer used in a motor with a fixed shaft for a bearing element is formed in particular by a polymer layer with a composition according to the invention. It is also possible however, that the polymer layer is formed by a polymer, selected from a group comprising polytetrafluoroethylene, polyimide resins, epoxy resins, phenol resins, polyamide 6, polyamide 66, polyoxymethylene, silicons, polyaryl ether ketones, polyaryl ether-ether ketones, polyvinylidene difluorides, polyethylene sulphides, whereby there can be a corresponding adjustment to the expected movement, as these polymers have completely different properties, in particular with respect to the material transfer from the shaft to the bearing element which is caused by the micro-movement.

In this case the polymer layer can also include friction-reducing additives, such as e.g. $MoS_2$, graphite, boron nitride (hexagonal), tungsten disulphide, PTFE, lead, so that said polymer layer can not only be used to ensure "transport safety" but at least in the warm-up phase of the engine can be used to provide a suitable reduction in sliding friction between the bearing element and the shaft.

As already mentioned, on a bearing element a lubricating varnish can be used consisting of a polymer, in particular selected from a group comprising polytetrafluoroethylene, polyimide resins, epoxy resins, phenol resins, polyamide 6, polyamide 66, polyoxymethylene, silicons, polyaryl ether ketones, polyaryl ether-ether ketones, polyvinylidene difluorides, polyethylene sulphides, to produce a polymer layer as a protective layer to prevent the transfer of material from a fixed shaft onto the bearing element. In this way it is possible to complete engines directly at the manufacturers without having to take special precautions or without running the risk that during the transport of the already completed engines the material of the bearing becomes welded to the shaft. It is thus possible to supply such components in a preassembled form to the respective customer, in particular the car industry, which is known to be following the trend of increasingly buying finished components, with lower damage rates to the components.

BRIEF DESCRIPTION OF THE DRAWINGS

For a better understanding of the invention the latter is explained in more detail with reference to the following figures. In a schematically simplified view:

FIG. 3 shows a motor with a shaft which is mounted by at least one bearing element according to the invention.

Firstly, it should be mentioned that in various embodiments described the same parts are provided with the same reference numbers and the same component names, whereby the disclosures contained throughout the entire description can be applied to the same parts with the same reference number and same component names, The indications of position used in the description, such as e.g. top, bottom, side etc. relate to the Figure being described at the time and should be transposed to new positions after a change in position. Furthermore, individual features or combinations of features from the various different embodiments that are shown and described can form independent inventive solutions in their own right.

Figure 1:
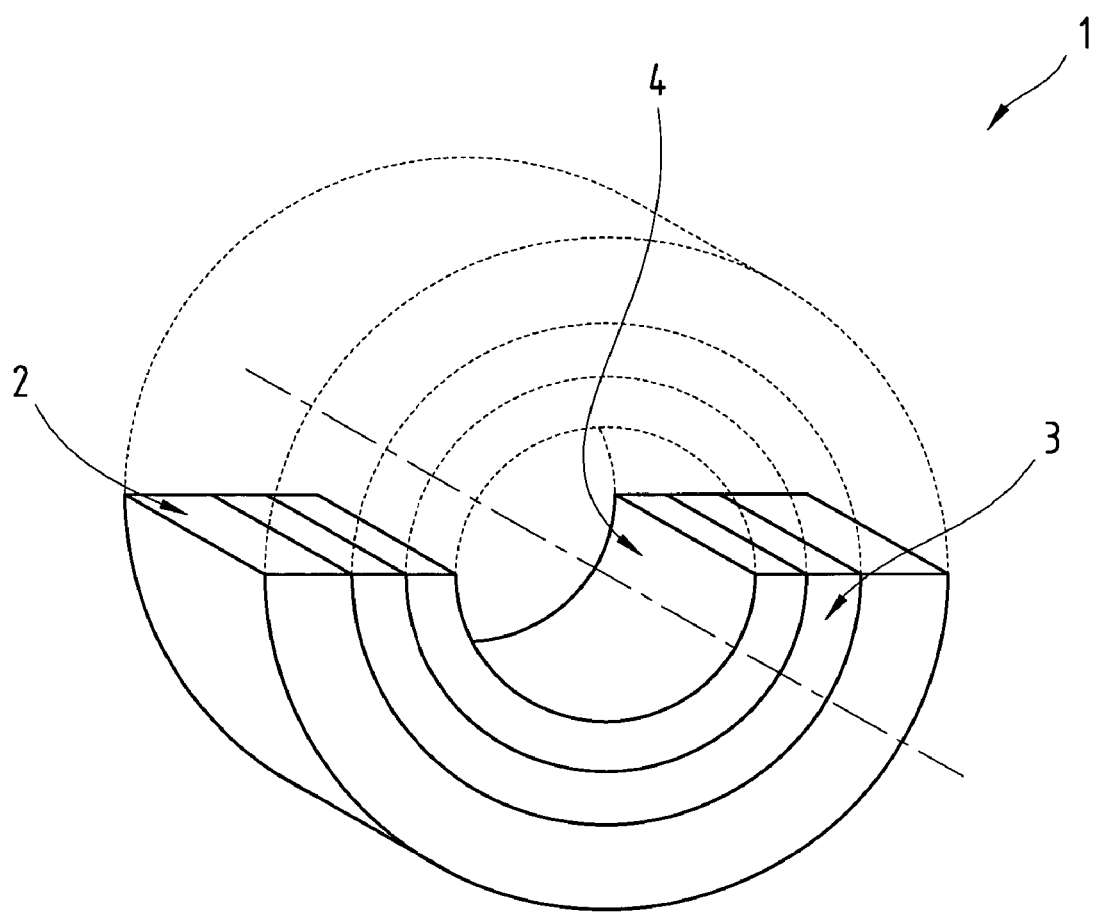
FIG. 1 shows a bearing element according to the invention in the form of a lubricating bearing half-shell.

The bearing element 1 according to FIG. 1 is made up of a support body 2, a bearing metal layer 3 and a polymer layer 4 as a running layer. The support body 2 is usually made of steel but can of course also be made of comparable materials which can perform the same or similar function, i.e. provide the mechanical strength of the bearing element 1. The mechanical strength of the entire bearing element 1 is thus dependent on the respective area of use, so that for example various different copper alloys such as e.g. brass, bronzes can be used. In addition the support body 2 ensures a certain degree of stability of shape.

The bearing metal layer 3 is formed by a bearing metal alloy. The latter in this embodiment comprises an aluminium matrix in which at least one soft phase and hard particles are embedded. The at least one soft phase can be formed by at least one element from a first element group comprising tin, antimony, indium and bismuth. The hard particles can e.g. be formed by at least one element of a second element group comprising copper, manganese, cobalt, chromium and iron or by the elements scandium and/or zirconium. It is also possible that these hard particles are formed by intermetallic phases in particular the latter elements or the elements of the second element group with aluminium or by intermetallic phases formed by the said elements.

Of course, any other soft phases and/or hard particles known from the prior art can be contained in the bearing metal alloy.

By means of the soft phase it is possible to give the bearing element 1 emergency operating properties if defects occur in the polymer layer 4 due to the operation of the bearing element 1 and thus the bearing metal layer 3 comes into contact at least almost directly with a component to be mounted, e.g. a shaft. Thus the bearing element 1 is also given the ability to embed the hard particles originating from abrasion after the use of the bearing element 1. The hard particles give the aluminium alloy the necessary mechanical strength.

Alloys based on tin, bismuth, indium, lead or aluminium are also suitable for the bearing metal layer 3 as well as alloys with a high lead content CuPb— or AlSn— or AlBi base. In particular higher tin-containing tin bases alloys are advantageous. Even lead-free copper based alloys can be used.

Copper-based bearing metals that could be used would be for example CuPb22Sn2, CuPb10Sn10, CuPb15Sn7, CuSn6, CuSn4 Zn1. In particular lead-free copper alloys with a base of CuAl, CuSn, CuZn, CuSnZn, CuZnSn and CuBi base are advantageous with respect to the lower level of pollution.

Tin-based bearing metals that could be used would be for example SnSb8Cu4, SnSb12Cu6Pb.

Lead-based bearing metals that could be used would be for example PbSb10Sn6, PbSb15Sn10, PbSb15SnAs.

Aluminium based bearing metals can form e.g. AlSn4O, AlSn2O, AlSn25, AlSn10, AlSn6 etc.

It is also possible to use bearing metals with an AlZn base, such as e.g. AlZn4SiPb or an AlSi base, such as e.g. AlSi11CuMgNi or an AlSnSi-base such as e.g. AlSn2OSi4.

According to the invention the polymer layer 4 consists of a polyimide resin, molybdenum sulphide and graphite, whereby the proportion of the polyimide resin in the polymer layer 4 is selected from a range with a lower limit of 60% and an upper limit of 80%, the proportion of $MoS_2$, selected from a range with a lower limit of 15% and an upper limit of 25% and the proportion of graphite selected from a range with a lower limit of 5% and an upper limit of 15%.

The resin can be provided in at least one solvent, in particular an organic solvent, such as e.g. xylol, which can improve its processability. The proportion of solvent can here be selected from a range with a lower limit of 40 wt. % and an upper limit of 80 wt. %, in particular with a lower limit of 50 wt. % and an upper limit of 70 wt. %, preferably with a lower limit of 60 wt. % and an upper limit of 65 wt. % relative to the resin proportion, i.e. resin with solvent. Thus the dry resin content, in particular the polyamide imide resin can be selected from a range with a lower limit of 20 wt. % and an upper limit of 50 wt. %, in particular a lower limit of 30 wt. % and an upper limit of 40 wt. %, preferably a lower limit of 35 wt. % and an upper limit of 37.5 wt. %. In this respect a polymer layer 4 applied according to the invention can have for example a dry composition of 35 wt. % polyamide imide resin, 45 wt. % $MoS_2$ and 20 wt. % graphite, or a dry composition which is calculated from the given value ranges for the individual contents of the polymer layer 4.

If necessary, said polymer layer 4 can contain further additives to increase its mechanical strength, such as for example fibre matrices, such as e.g. aramide fibres, hard materials, such as e.g. carbides, oxides, nitrides. These kinds of additives are already known from the prior art for these kinds of polymer layers 4 for bearing elements 1, for example from EP 1 236 914 A1. Thus it is possible e.g. to use hard materials made of $CrO_2$, $Fe_3O_4$, PbO, ZnO, CdO, $Al_2O_3$, $SiO_2$, $SnO_2$, SiC, $Si_3N_4$, whereby their proportions can vary within the usual limits such as e.g., described in this EP-A1.

It is particularly advantageous if hard particles are used to adjust the frictional value which are already contained in the layer 3.

It is also particularly advantageous if the ratio between the proportions of $MoS_2$ and graphite in the polymer layer 4 is selected from a range of 1.5:1 to 4.5:1, for example 1.5:1 to 2.5:1.

With the composition for the polymer layer 4 according to the invention it is possible to produce a running layer with good lubrication and emergency operation properties, if necessary even permitting dry running. The latter is characterised in particular by requiring little maintenance. It is possible to operate using very little lubricant or no lubricant at all. If necessary water can be used for lubrication which is particularly advantageous if the bearing element 1 according to the invention is used e.g. for pumps. As well as a corresponding reduction in weight a lower sensitivity to bearing end pressure can be observed.

The bearing element 1 according to the invention can be used instead of the design as a lubricating bearing half-shell, as shown in FIG. 1, in other areas, for example as a thrust ring, lubricating bush etc., in particular for use in the motor industry.

Table 1 lists examples of compositions selected from the ranges according to the invention for the proportions of polyimide resin with solvent to be removed, $MoS_2$ and graphite for the polymer layer 4, whereby the latter of course are not intended to be limiting for the invention, but these examples merely display the character of the invention.

TABLE 1

| No. | PA I (%) | $MoS_2$ (%) | Graphite (%) |
| --- | --- | --- | --- |
| 1 | 60 | 25 | 15 |
| 2 | 62 | 25 | 13 |
| 3 | 65 | 20 | 15 |
| 4 | 68 | 17 | 15 |
| 5 | 70 | 20 | 10 |
| 6 | 72 | 20 | 8 |
| 7 | 61 | 25 | 14 |
| 8 | 65 | 23 | 12 |
| 9 | 70 | 25 | 5 |
| 10 | 75 | 15 | 10 |
| 11 | 65 | 25 | 10 |
| 12 | 77 | 15 | 8 |
| 13 | 78 | 12 | 10 |
| 14 | 80 | 15 | 5 |

Bearing elements 1 with this composition were produced consisting of a steel protective shell onto which a CuPb22Sn2 bearing metal was applied and then the polymer layer 4 on top. It was shown in the subsequent investigations that with this composition very similar properties for the bearing element 1 can be produced, so that in the following these properties are discussed with reference to a bearing element 1 only by way of example with a polymer layer 4, containing 70% polyimide resin, 20% $MoS_2$ and 10% graphite.

With regard to a critical limit for frictional welding of 100% for the bearing according to the invention a standard bearing from the prior art with a PTFE coating on AlSn 40 has by comparison a limit that is about 87% worse under the same experimental conditions.

The wearing resistance was measured on a bearing with the same dimensions and the same lubrication conditions. It was shown that the polymer layer 4 according to the invention had a wearing resistance 8 times better than a PTFE layer.

In further investigations the polymer layer 4 with this composition according to the invention was applied onto a bearing metal layer made of CuPb22Sn2 or AlSn25, and it was discovered that the wearing resistance varies within +/−5% of the value achieved with AlSn40, which means that the polymer layer 4 according to the invention can be applied at least onto all current bearing metals without their excellent properties changing considerably.

Corresponding improvements can also be achieved with respect to corrosion.

Figure 2:
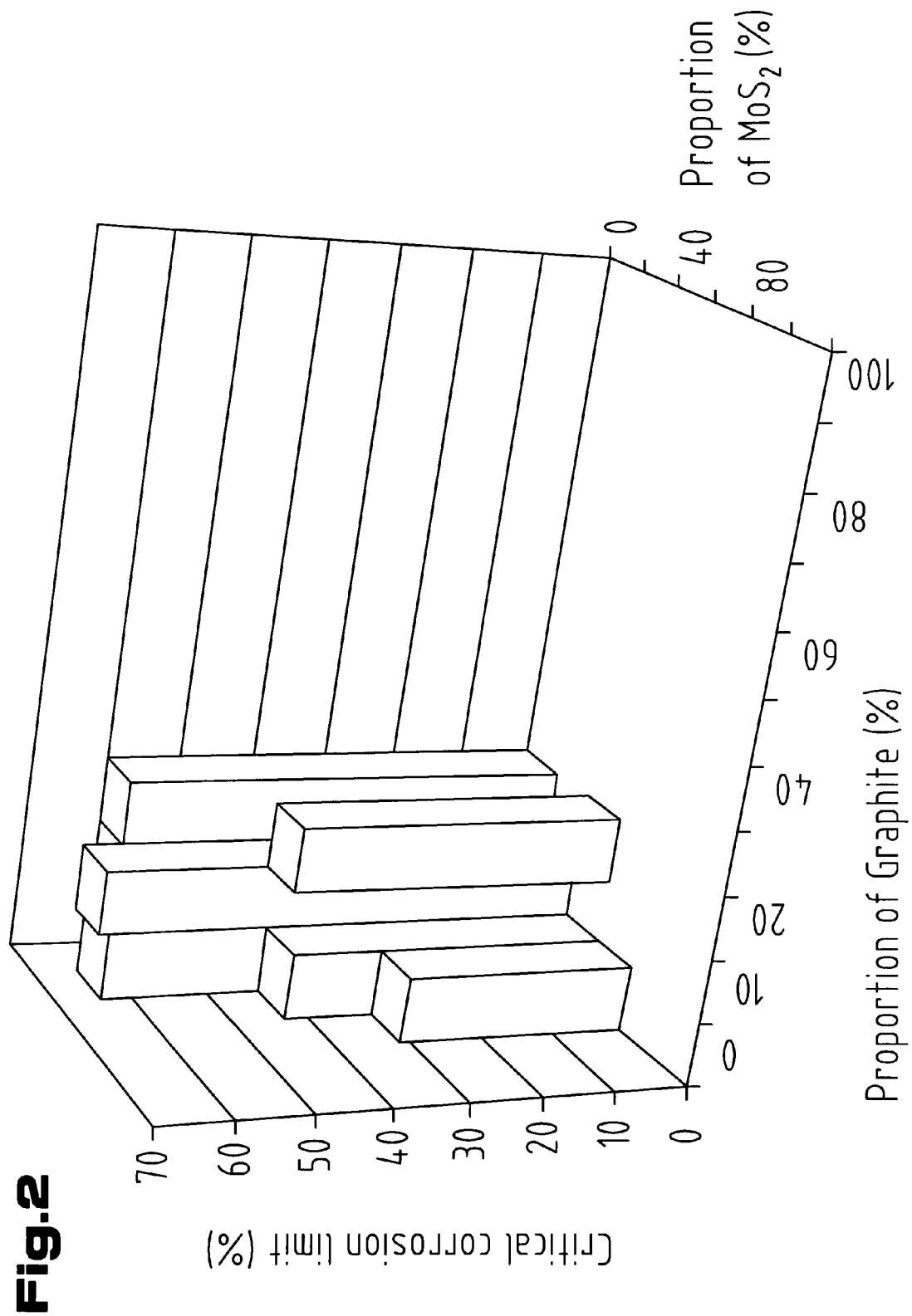
FIG. 2 shows a diagram in which the respective critical limit is shown as a function of varying proportions of $MoS_2$ and graphite.

In FIG. 2 the critical corrosion limit is given in percent against the proportion of graphite and the proportion of $MoS_2$ both in percent, whereby for the composition 70% resin, 20% $MoS_2$ and 10% graphite the value 100% is standard, and the respective figures can be taken from Table 2. From this graphic it can be seen clearly that the polymer layer 4 according to the invention, i.e. bearing elements 1 provided with the layer have much better results with respect to the critical corrosion limit than corresponding polyimide resin layers, which are known from the prior art.

TABLE 2

| | Graphite [%] | | |
| --- | --- | --- | --- |
| $MoS_2$ [%] | 5 | 10 | 15 |
| 15 | | | 91.8 |
| 20 | 98 | 100 | |
| 40 | 65.8 | | 67.4 |
| 60 | 47.5 | | |

With regard to the self-lubricating behaviour it has been found that the properties can be improved if MoS$_2$ platelets are used which have the dimensions already mentioned above.

It is also an advantage if graphite is used with a particle size selected from a range with a lower limit of 2 μm and an upper limit of 8 μm.

A further improvement of the properties, in particular the wear resistance to cavitation and the resistance to corrosion, both in warm-up mode and continuous operation, can be achieved if a bearing element 1 is produced with the polymer layer 4 composed according to the invention, in which said polymer layer 4 has a roughness profile, with values for the roughness profile Rz according to DIN ISO 4287 or ASME B 46.1 or arithmetic average roughness values Ra also according to DIN ISO 4287 or ASME B 46.1 according to the already described values or selected from the ranges given.

The manufacture of the bearing element 1 according to the invention is carried out so that the bearing metal layer 3 is formed on a metal support body 2 using methods known from the prior art, such as e.g. rolling, casting, sintering, electrolyte deposition or by means of a sputtering method. The polymer layer 4 according to the invention can also be applied onto said bearing metal layer 3 using methods known from the prior art, such as e.g. a spraying method or spreading method, whereby the polymer layer can subsequently be heat treated. Suitable pretreatments are also known from the prior art which means that they need not be discussed here.

The polymer layer 4 according to the invention is particularly suitable for the equipment of bearing elements 1 for engines, whereby said polymer layer 4 is used as a protective layer or "packaging layer" to avoid the transfer of material from the shaft to the bearing metal or bearing element 1 and prevent microwelding, which can lead to engine failure. In order to obtain and increase this effect it is also possible to coat the shaft itself with the polymer layer 4. Generally, the polymer layer 4 can be used as a so-called protective layer to prevent such microwelding caused by the transfer of material from a mounted component to a corresponding bearing component.

For this design of a protective layer or "packaging layer" for the transport of already assembled engines with fixed shafts, in addition to the particularly suitable polymer layer 4 according to the invention, polymer layers can also be used that are based on polytetrafluoroethylene, polyimide resins, epoxy resins, phenol resins, polyamide 6, polyamide 66, polyoxymethylene, silicons, polyaryl ether ketones, polyaryl ether-ether ketones, polyvinylidene difluorides, polyethylene sulphides, as well as mixtures thereof, whereby also self-lubricating additives such as e.g. MoS$_2$, graphite, hexagonal BN, diverse metal sulphides etc. can be added to said polymers, as well as the already mentioned hard particles.

FIG. 3 shows a motor 5 with a shaft 6 which is mounted by a bearing element 1 according to the invention.

The exemplary embodiments show possible design variants of the bearing element 1, whereby it should be mentioned at this point, that the invention is not restricted to the embodiments shown in particular, but rather various different combinations of the individual embodiment variants are possible, and these possible variations are within the capability of one skilled in this technical field based on the technical teaching of the present invention. Thus all conceivable design variants are covered by the protection of this patent that are possible by combining individual details of the embodiments shown and described.

For form's sake it should be mentioned that for a better understanding of the structure of the bearing element 1 the latter and its components are not completely true to scale and/or have been enlarged and/or reduced in size.

The underlying objective of the independent solutions according to the invention can be taken from the description.

| List of Reference Numbers |
|---|
| 1. Bearing element |
| 2. Support body |
| 3. Bearing metal layer |
| 4. Polymer layer |
| 5. Motor |
| 6. Shaft |

What is claimed is:

1. Bearing element for a combustion engine consisting of a metallic support body, a bearing metal layer arranged over the metallic support body and a polymer layer arranged on top of the bearing metal layer, whereby the polymer layer consists of a polyamide imide resin in an amount of 35 wt % dry resin, molybdenum sulphide (MoS$_2$) in an amount of 45 wt. % and graphite in an amount of 20 wt. %, relative to the total polymer layer, wherein the MoS$_2$ comprises MoS$_2$ platelets with an average length selected from a range with a lower limit of 10 μm and an upper limit of 40 μm, an average width selected from a range with a lower limit of 10 μm and an upper limit of 40 μm, and an average height selected from a range with a lower limit of 2 nm and an upper limit of 20 nm.

2. Bearing element for a combustion engine consisting of a metallic support body, a bearing metal layer arranged over the metallic support body and a polymer layer arranged on top of the bearing metal layer, whereby the polymer layer consists of a polyamide imide resin, molybdenum sulphide (MoS$_2$) and graphite, wherein the polyamide imide resin is present in dry form in a proportion selected from a range with a lower limit of 23.08 wt.-% and an upper limit of 70.59 wt.-% relative to the polymer layer, the MoS$_2$ is present in a proportion selected from a range with a lower limit of 22.06 wt.-% and an upper limit of 48.08 wt.-% and the graphite is present in a proportion selected from a range with a lower limit of 7.35 wt.-% and an upper limit of 28.85 wt.-%, and wherein the MoS$_2$ comprises MoS$_2$ platelets with an average length selected from a range with a lower limit of 10 μm and an upper limit of 40 μm, an average width selected from a range with a lower limit of 10 μm and an upper limit of 40 μm, and an average height selected from a range with a lower limit of 2 nm and an upper limit of 20 nm.

3. Bearing element according to claim 1, wherein the MoS$_2$ and the graphite are present in a ratio of MoS$_2$ to graphite selected from a range with a lower limit of 1.5:1 and an upper limit of 4.5:1.

4. Bearing element according to claim 1, wherein the graphite included has a particle size selected from a range with a lower limit of 2 μm and an upper limit of 8 μm.

5. Bearing element according to claim 1, wherein the bearing metal layer is in the form of an alloy, selected from a group comprising aluminium base alloys, tin base alloys, lead base alloys, copper base alloys, CuPb base alloys, AlSn base alloys, alloys based on AlZn, AlSi, AlSnSi, CuAl, CuSn, CuZn, CuSnZn, CuZnSn, CuBi and AlBi.

6. Bearing element according to claim 1, wherein a surface of the polymer layer has an arithmetic average roughness Ra selected from a range with a lower limit of 0.2 μm and an upper limit of 1.5 μm.

7. Bearing element according to claim 1, wherein a surface of the polymer layer has a maximum roughness profile Rz selected from a range with a lower limit of 3 μm and an upper limit of 8 μm.

8. Bearing element according to claim 1, wherein the polymer layer has an average thickness selected from a range with a lower limit of 1 μm and an upper limit of 40 μm.

9. Bearing element according to claim 1, wherein the polymer layer has a Vickers hardness selected from a range with a lower limit of 22 HV and an upper limit of 35 HV.

10. Bearing element according to claim 1, wherein the metallic support body, bearing metal layer, and polymer layer form a lubricated bearing half-shell or a thrust ring or a bearing bush.

11. Motor with a shaft which is mounted by at least one bearing element, and wherein the bearing element comprises a metallic support body, a bearing metal layer arranged over the metallic support body and a polymer layer arranged on top of the bearing metal layer, whereby the polymer layer consists of a polyamide imide resin, molybdenum sulphide ($MoS_2$) and graphite, wherein the polyamide imide resin is present in dry form in a proportion selected from a range with a lower limit of 23.08 wt.-% and an upper limit of 70.59 wt.-% relative to the polymer layer, the $MoS_2$ is present in a proportion selected from a range with a lower limit of 22.06 wt.-% and an upper limit of 48.08 wt.-% and the graphite is present in a proportion selected from a range with a lower limit of 7.35 wt.-% and an upper limit of 28.85 wt.-% and wherein the $MoS_2$ comprises $MoS_2$ platelets with an average length selected from a range with a lower limit of 10 μm and an upper limit of 40 μm, an average width selected from a range with a lower limit of 10 μm and an upper limit of 40 μm, and an average height selected from a range with a lower limit of 2 nm and an upper limit of 20 nm.

\* \* \* \* \*

UNITED STATES PATENT AND TRADEMARK OFFICE
CERTIFICATE OF CORRECTION

| | | |
|---|---|---|
| PATENT NO. | : 8,033,733 B2 | Page 1 of 1 |
| APPLICATION NO. | : 11/413711 | |
| DATED | : October 11, 2011 | |
| INVENTOR(S) | : Lang | |

It is certified that error appears in the above-identified patent and that said Letters Patent is hereby corrected as shown below:

In particular, in Column 10, line 51 (Line 1 of Claim 3) please change "claim 1" to correctly read: -- claim 2 --.

In Column 10, line 55 (Line 1 of Claim 4) please change "claim 1" to correctly read: -- claim 2 --.

In Column 10, line 58 (Line 1 of Claim 5) please change "claim 1" to correctly read: -- claim 2 --.

In Column 10, line 64 (Line 1 of Claim 6) please change "claim 1" to correctly read: -- claim 2 --.

In Column 11, line 1 (Line 1 of Claim 7) please change "claim 1" to correctly read: -- claim 2 --.

In Column 11, line 5 (Line 1 of Claim 8) please change "claim 1" to correctly read: -- claim 2 --.

In Column 11, line 8 (Line 1 of Claim 9) please change "claim 1" to correctly read: -- claim 2 --.

In Column 11, line 11 (Line 1 of Claim 10) please change "claim 1" to correctly read: -- claim 2 --.

Signed and Sealed this
Twenty-ninth Day of May, 2012

David J. Kappos
*Director of the United States Patent and Trademark Office*